(12) United States Patent
Kozono et al.

(10) Patent No.: US 11,630,539 B2
(45) Date of Patent: Apr. 18, 2023

(54) INPUT ACCEPTING DEVICE, INPUT ACCEPTING METHOD, AND NON-TRANSITORY STORAGE MEDIUM

(71) Applicant: TOYOTA JIDOSHA KABUSHIKI KAISHA, Toyota (JP)

(72) Inventors: Yuki Kozono, Kazaki (JP); Shu Nakajima, Toyota (JP); Takeshi Nawata, Iwakura (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/585,926

(22) Filed: Jan. 27, 2022

(65) Prior Publication Data

US 2022/0308689 A1 Sep. 29, 2022

(30) Foreign Application Priority Data

Mar. 26, 2021 (JP) .............................. JP2021-054313

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
None
See application file for complete search history.

(56) References Cited

U.S. PATENT DOCUMENTS

2014/0239739 A1 8/2014 Shibata
2021/0382577 A1* 12/2021 Imai .................. G06F 3/0488
2021/0397299 A1* 12/2021 Imai .................. G06F 3/0418

FOREIGN PATENT DOCUMENTS

JP 2014-167868 A 9/2014
JP 2019-23012 A 2/2019

* cited by examiner

*Primary Examiner* — Stephen T. Reed
(74) *Attorney, Agent, or Firm* — Oblon, McClelland, Maier & Neustadt, L.L.P.

(57) ABSTRACT

An input accepting device includes a memory, and a processor coupled to the memory. In a case in which a detected value of electrostatic capacity detected by an electrostatic sensor is greater than or equal to a first threshold value, the processor accepts operation due to contact of an operator. In a case in which a state, in which the detected value of the electrostatic capacity detected by the electrostatic sensor is greater than or equal to a second threshold value, continues for a first time period, the processor determines that there is contact by the operator. In a case in which it is determined that there is contact by the operator, the processor sets the first threshold value to a value that is greater than or equal to the second threshold value based on the detected value detected by the electrostatic sensor.

17 Claims, 6 Drawing Sheets

| DETECTED VALUE X | FIRST THRESHOLD VALUE Z1 |
|---|---|
| Y1<X | Y1 |
| Y2<X<Y1 | Y2 |
| ... | ... |
| X<Yn | Yn |

INPUT ACCEPTING DEVICE, INPUT ACCEPTING METHOD, AND NON-TRANSITORY STORAGE MEDIUM

CROSS-REFERENCE TO RELATED APPLICATION

This application is based on and claims priority under 35 USC 119 from Japanese Patent Application No. 2021-054313 filed on Mar. 26, 2021, the disclosure of which is incorporated by reference herein.

BACKGROUND

Technical Field

The present disclosure relates to an input accepting device, an input accepting method, and a non-transitory storage medium.

Related Art

There are conventionally known electrostatic switches in which an electrostatic sensor is provided at an operation surface, and input operation by an operator is accepted based on the electrostatic capacity detected by the electrostatic sensor. The detected value of the electrostatic sensor increases due to an operator's finger or the like approaching or contacting the operation surface. The electrostatic switch determines that there is contact by an operator due to the detected electrostatic capacity exceeding a predetermined threshold value.

The electrostatic capacity that is detected differs in accordance with whether or not the operator is wearing gloves, individual differences among operators, and the state of the fingertip. Therefore, there is the concern that accurate judgment may not be able to be carried out when the absence/presence of contact by an operator is determined in accordance with a fixed threshold value. For example, the detected value in a case in which the operator is wearing gloves is lower than the detected value in a case in which the operator is using his/her bare hands. If a predetermined threshold value that is suitable for a case in which gloves are being worn is set, there is the concern that, in a case in which the operator is using bare hands, it will be determined there is contact even if a finger has merely approached the operation surface. On the other hand, if the predetermined threshold value is set such that it can be determined that there is contact only when bare hands are used, it cannot be determined that a contact operation has been carried out in a case in which the operator carries out the contact operation while wearing gloves.

An input device that adjusts a threshold value for judging contact by an operator is disclosed in Japanese Patent Application Laid-Open (JP-A) No. 2014-167868 for example. Concretely, an electrostatic sensor is provided at the surface of or at the base of a mechanical switch, and the threshold value for judging contact of the electrostatic sensor is adjusted based on the detected value of the electrostatic capacity that is detected at the time when operation of the mechanical switch is sensed.

However, in the input device disclosed in JP-A No. 2014-167868, because adjustment of the threshold value for judging contact of the electrostatic sensor is started due to the mechanical switch being depressed by the operator, the threshold value cannot be changed unless the mechanical switch is depressed. Accordingly, even if an operator wishes to carry out input by a contact operation, there are cases in which the input device does not accept the contact operation until the input of depressing the mechanical switch is carried out.

SUMMARY

The present disclosure makes it possible to adjust a threshold value for judging contact when an electrostatic sensor is used as an input device, without a mechanical switch being depressed.

An input accepting device relating to a first embodied aspect has: operation accepting means that accepts an operation that is due to contact by an operator, in a case in which a detected value of electrostatic capacity detected by an electrostatic sensor is greater than or equal to a first threshold value; contact judging means for judging that there is contact by the operator in a case in which a state, in which the detected value of the electrostatic capacity detected by the electrostatic sensor is greater than or equal to a second threshold value, continues for a first time period; and setting means for, in a case in which the contact judging means determines that there is contact by the operator, setting the first threshold value to a value that is greater than or equal to the second threshold value based on the detected value detected by the electrostatic sensor.

In an input accepting device relating to a second embodied aspect, in a case in which the contact judging means determines that there is contact by the operator, the setting means sets the first threshold value based on an average value of detected values detected by the electrostatic sensor during the first time period.

In an input accepting device relating to a third embodied aspect, the setting means sets one candidate threshold value of two or more candidate threshold values as the first threshold value, and sets a candidate threshold value, which is smaller than the detected value detected by the electrostatic sensor and is close to the detected value of the two or more candidate threshold values, as the first threshold value.

In an input accepting device relating to a fourth embodied aspect, in a case in which the detected value detected by the electrostatic sensor is greater than a candidate threshold value that is smallest of the two or more candidate threshold values, the setting means sets a candidate threshold value, which is smaller than the detected value and is close to the detected value of the two or more candidate threshold values, as the first threshold value, and, in a case in which the detected value is less than or equal to the smallest candidate threshold value of the two or more candidate threshold values, the setting means sets the smallest candidate threshold value as the first threshold value.

An input accepting device relating to a fifth embodied aspect is an onboard device that transitions from a stopped state to an operating state in a case in which a vehicle transitions from a first state to a second state, and, in a case in which the input accepting device transitions from the stopped state to the operating state, the setting means sets the first threshold value to an initial value regardless of setting of the first threshold value in an operating state of a previous time.

In an input accepting device relating to a sixth embodied aspect, during a time period in which a second time period has not elapsed from setting of the first threshold value, the setting means does not set the first threshold value even if the contact judging means determines that there is contact by the operator, and, in a case in which, after the second time period has elapsed, the contact judging means determines that there is contact by the operator, the setting means sets the first threshold value again.

In an input accepting device relating to a seventh embodied aspect, the electrostatic sensor is provided at a steering wheel of a vehicle, and the second time period is changed based on a traveling state of the vehicle.

Another aspect of the present disclosure is an input accepting method that relates to an eight embodied aspect. This is an input accepting method that: determines whether there is contact by an operator based on a detected value of electrostatic capacity detected by an electrostatic sensor; in a case in which it determined that there is contact by the operator, sets a first threshold value based on the detected value detected by the electrostatic sensor; and, in a case in which the detected value detected by the electrostatic sensor is greater than or equal to the first threshold value set by the setting means, accepts operation that is due to the contact by the operator.

Another aspect of the present disclosure is a non-transitory storage medium that stores an input accepting program and relates to a ninth embodied aspect. This is a non-transitory storage medium that stores a program for causing an information processing device to execute input accepting processing that includes: judging whether there is contact by an operator based on a detected value of electrostatic capacity detected by an electrostatic sensor; in a case in which it determined that there is contact by the operator, setting a first threshold value based on the detected value detected by the electrostatic sensor; and, in a case in which the detected value detected by the electrostatic sensor is greater than or equal to the first threshold value set by the setting means, accepting operation that is due to the contact by the operator.

As described above, in accordance with the input accepting device, input accepting method, and non-transitory storage medium relating to the present disclosure, a threshold value for judging contact when an electrostatic sensor is used as an input device can be adjusted by a simple mechanical structure.

BRIEF DESCRIPTION OF THE DRAWINGS

Exemplary embodiments of the present invention will be described in detail based on the following figures, wherein.

DETAILED DESCRIPTION

A concrete embodiment of the present disclosure is described hereinafter based on the drawings. The arrangement and the like of the structural parts described in the present embodiment are not intended to limit the technical scope of the disclosure unless so stated.

Embodiment

An example is described of a case in which the present disclosure is applied to an electrostatic switch 2000 that is provided at the steering wheel of a vehicle. The electrostatic switch 2000 is mounted to an arbitrary position at which the switch can be operated by the driver (operator), such as at a spoke of the steering wheel or the like. The present disclosure can also be applied to input accepting devices that utilize electrostatic sensors at other than the steering wheel of a vehicle.

Figure 1:
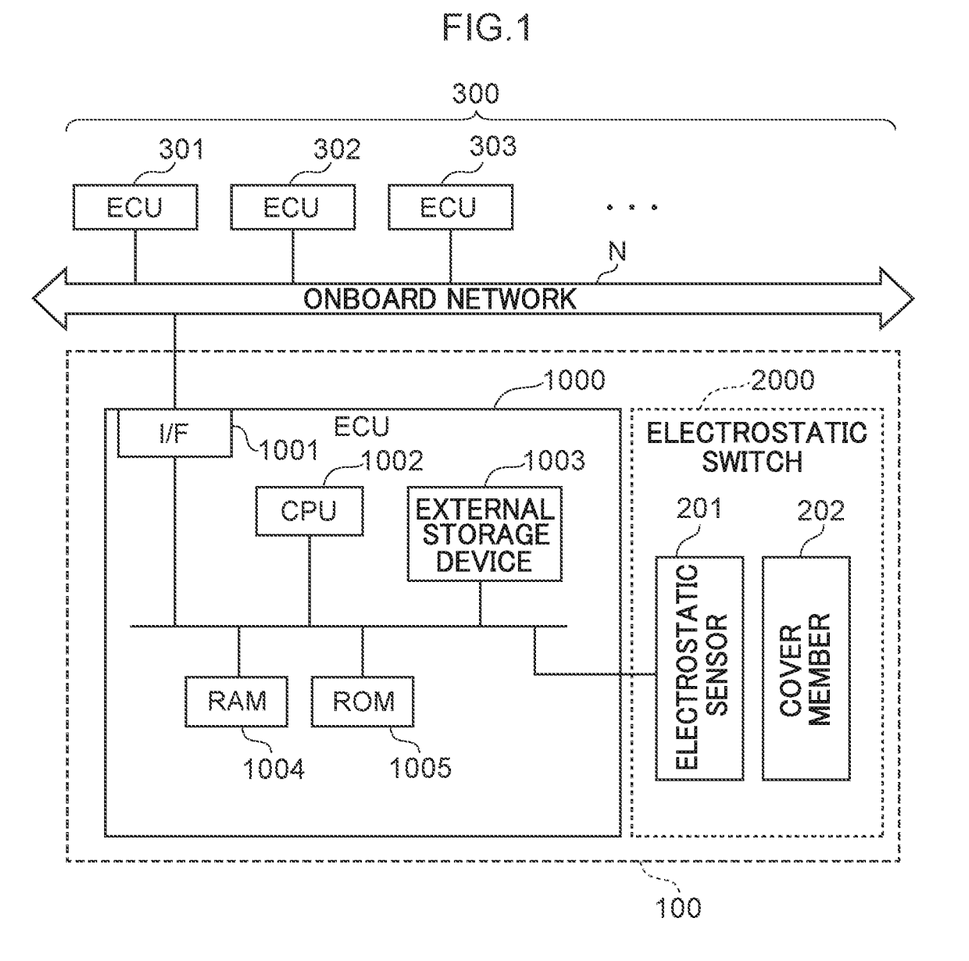
FIG. 1 is a block drawing showing an example of hardware structures of an onboard device group relating to an embodiment.

FIG. 1 is a block drawing showing an example of hardware structures of an onboard device group relating to the embodiment. The vehicle has an onboard device group in which an ECU 1000 and the electrostatic switch 2000, which realize the structures of an input accepting device 100, and devices that are objects of control, which are formed from plural ECUs 301 through 303, are connected so as to be able to communicate via a communication path. The embodiment of FIG. 1 is configured such that the input accepting device 100 includes the electrostatic switch 2000, but the ECU 1000, which receives signals from an electrostatic switch at the exterior, may itself be the input accepting device, without the input accepting device 100 including the electrostatic switch 2000.

For example, the ECU 1000 of the input accepting device 100 has, with a CPU (Central Processing Unit) 1002 being a central structure thereof, storage media that serve as external storage devices such as a RAM (Random Access Memory) 1004, a ROM (Read Only Memory) 1005, an HDD (Hard Disk Drive) 1003 and the like, and an unillustrated timer and an I/F (Inter Face) 1001. These are configured such that a communication interface such as a CAN (Controller Area Network) driver or the like is connected thereto via a bus. The ECU 1000 may be provided in a vicinity of the electrostatic sensor 201, or may be provided as a body separate from the electrostatic sensor 201. The ECU 1000 is configured to be able to acquire the electrostatic capacity detected by the electrostatic sensor 201. The ECU 1000 sends a control signal to the control object device 300 based on the detected value of the electrostatic capacity acquired from the electrostatic sensor 201.

The electrostatic sensor 201 detects electrostatic capacity and outputs the detected value to the ECU 1000. The structure of the electrostatic sensor 201 is well-known, and, therefore, detailed description thereof is omitted. The electrostatic capacity detecting surface of the electrostatic sensor 201 is covered by a cover member 202 and is provided at the operation surface of the electrostatic switch 2000. Due to a person's finger or the like contacting or approaching the detection surface, the detected value of the electrostatic capacity increases. The electrostatic sensor 201 may detect the distribution of electrostatic capacities at the detection surface, or the changes over time in the distribution. Due thereto, touch operations and tracing operations and the like of plural fingers can be detected.

Based on the detected value inputted from the electrostatic sensor 201, the ECU 1000 determines whether operation input has been carried out at the electrostatic switch 2000. Further, the ECU 1000 of the input accepting device 100 outputs a control signal, which corresponds to the operation input that is inputted to the electrostatic switch 2000, to the control object device 300.

The control object devices 300 acquire control signals from the input accepting device 100, and execute control based on the acquired control signals. Examples of the control object devices 300 that are installed in the vehicle are the ECU 301 that realizes the function of an air conditioning device, the ECU 302 that realizes the function of an audio device, the ECU 303 that realizes the function of a navigation device, and an ECU 304 that realizes the function of another device. When a touch operation is carried out at the operation surface of electrostatic switch 1, the control object device 300 is controlled as a device to which, for example, a "select" operation has been inputted. Further, in a case in which a tracing operation is carried out at the operation surface of the electrostatic switch 1, the control object device 300 may be controlled as a device to which a scrolling operation, function selection, a raising/lowering operation of the volume or the set room temperature, or the like has been inputted.

Figure 2:
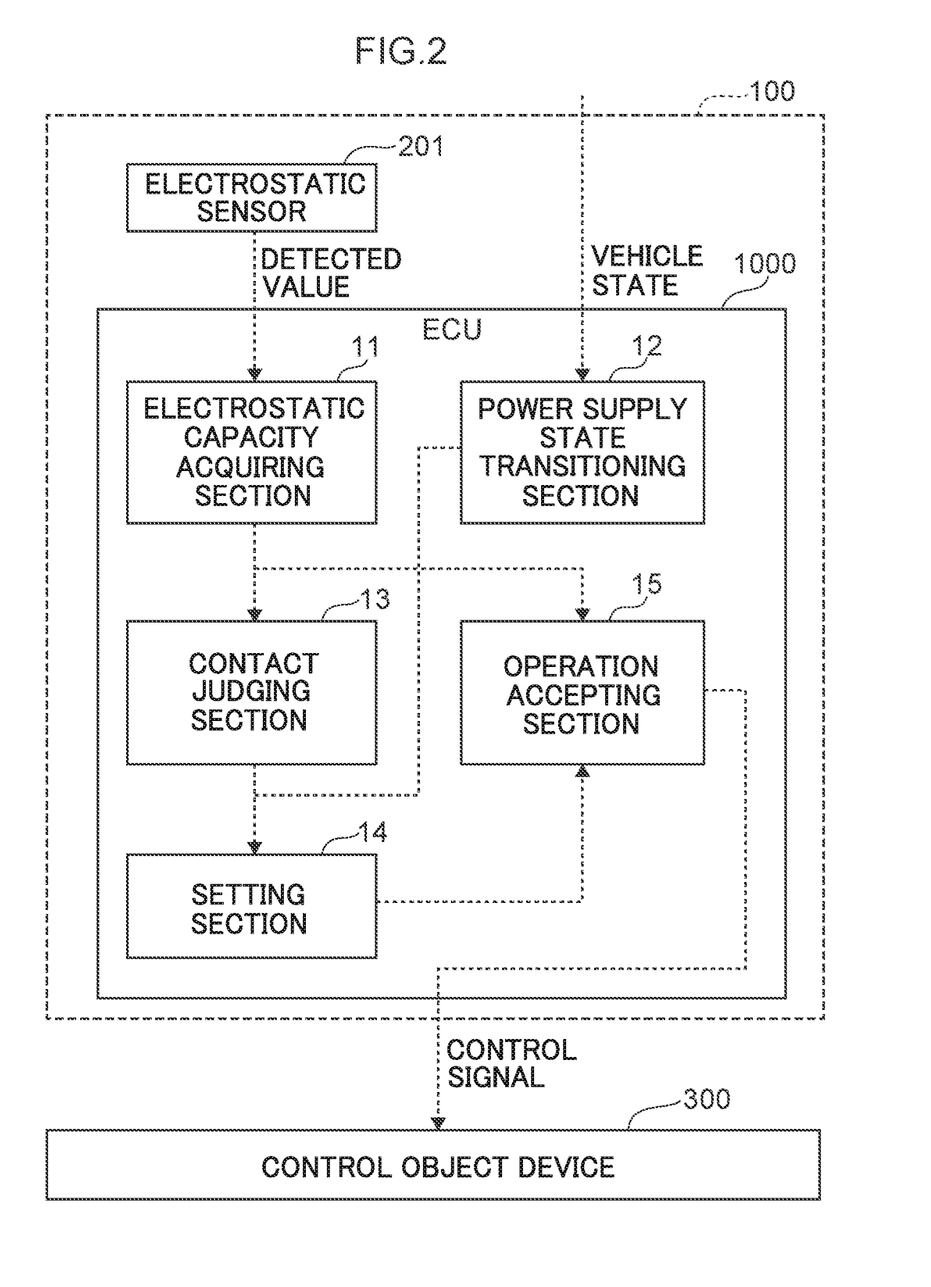
FIG. 2 is a block drawing showing functional structures of an input accepting device relating to the embodiment.

The functional structures of the input accepting device 100 in the present embodiment are described by using FIG. 2. These respective functional structures are realized by the CPU 1002 that serves as a processor executing programs that are stored in the storage medium 1003 that serves as a memory and/or in the ROM 1005 that serves as a memory. The input accepting device 100 has, as functional blocks thereof, an electrostatic capacity acquiring section 11, a power supply state transitioning section 12, a contact judging section 13, a setting section 14, and an operation accepting section 15.

The electrostatic capacity acquiring section 11 acquires the detected value that is detected by the electrostatic sensor 201, and is configured to be able to output the detected value to the contact judging section and the operation accepting section.

Based on a vehicle state, the power supply state transitioning section 12 causes the power supply state of the input accepting device 10 to transition to a stopped state and an operating state. In a case in which the vehicle state changes from a first state to a second state, the power supply state transitioning section 12 causes the power supply state of the input accepting device 10 to transition from the stopped state to the operating state. As an example, the first state is a state in which the power state of the vehicle is a stopped state, and is a case in which no occupant is riding in the vehicle. Further, as an example, the second state is a state in which the power state of the vehicle is a stopped state, and is a case in which an occupant is riding in the vehicle. Due to the power supply state transitioning section 12 being notified by another, unillustrated control device that the vehicle state has transitioned from the first state to the second state, the power supply state transitioning section 12 transitions from the stopped state to the operating state. Or, due to an unillustrated power supply device starting the supply of electric power to the input accepting device 100 accompanying a transition of the vehicle state from the first state to the second state, the power supply state transitioning section 12 may cause the power supply state of the input accepting device 100 to transition from the stopped state to the operating state. Here, the above-described examples are given as definitions of the first state and the second state, but the first state may be a state in which the power unit of the vehicle is stopped, and the second state may be a state in which the power unit of the vehicle is operating.

Based on the detected value of the electrostatic capacity that was acquired by the electrostatic capacity acquiring section 11, the operation accepting section 15 accepts the operation that is due to contact of an operator (hereinafter called accepting processing). In a case in which the detected value is greater than or equal to a first threshold value Z1 that is set in advance by the setting section 14, the operation accepting section 15 accepts the operation input that is inputted by the contact of an operator. In a case in which the operation is accepted by the operation accepting section 15, a control signal corresponding to the operation input is outputted by an unillustrated outputting section to the control object device 300 that is the object of operation.

Based on the detected value of the electrostatic capacity that is detected by the electrostatic sensor 201, the contact judging section 13 determines whether there is contact by an operator. As an example, the contact judging section 13 determines that there is contact by an operator in a case in which a state in which the detected value detected by the electrostatic sensor 201 is greater than or equal to a second threshold value Z2 continues for a first time period t1. For example, a value that is greater than the electrostatic capacity that is detected even though a person's finger or the like is not contacting the operation surface is set as the second threshold value, and, concretely, a value of an order of 1 pF or less is set. In a case in which the electrostatic switch 1 is provided at the steering wheel of a vehicle as in the present embodiment, the electrostatic sensor 201 will detect electrostatic capacity due to noise emitted by onboard equipment. By setting the second threshold value Z2 to a value such as described above, the concern that, due to noise, it will be erroneously detected that there is contact can be lessened. For example, a value that is such that contact can be detected even if the operator is wearing gloves is set as the second threshold value Z2. Due thereto, the fact that there is contact can be determined even in a case in which the operator is wearing gloves, and setting of the first threshold value Z1 that is described later can be carried out. The second threshold value Z2 may be set to the same value as Yn that is described later. The first time period t1 is, for example, 100 ms.

In a case in which the contact judging section determines 13 that there is contact by an operator, the setting section 14 sets the first threshold value Z1 (hereinafter called setting processing) based on detected value X that was detected by the electrostatic sensor. The detected value X may be the average value of detected values detected by the electrostatic sensor 201 during the first time period, or may be the maximum value of the detected values in the first time period. The way of selecting the detected value X can be selected freely within a scope in which the present disclosure can be embodied.

Figure 6:
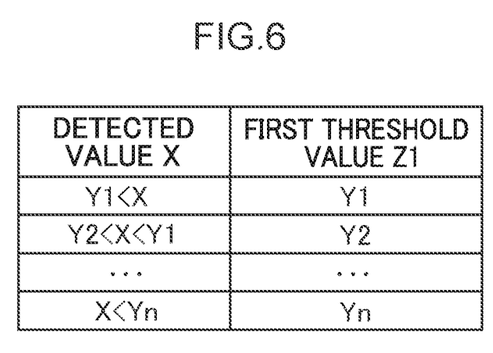
FIG. 6 is a table showing examples of the relationships of correspondence between first threshold values and detected values in accordance with the input accepting device relating to the embodiment.

FIG. 6 is a table showing examples of relationships of correspondence between detected values detected by the electrostatic sensor 201 and first threshold values. As an example, one candidate threshold value is selected from among a group Y={Y1, Y2, . . . Yn} of two or more candidate threshold values, and is set as the first threshold value Z1. n is an integer of 2 or more. Of the candidate threshold values Y1 through Yn, Y1 is the largest, and Yn is the smallest. For example, electrostatic capacity detected amounts at times when gloves are worn and electrostatic capacity detected amounts at times when gloves are not worn may be measured by experiment, and the respective values of the candidate threshold values Y1 through Yn may be set on the basis thereof. Relationships between the detected values and the set first threshold values Z1 are shown in FIG. 6. The setting section 14 sets, as the first threshold value Z1, candidate threshold value Ym that is smaller than the detected value X and that is near to the detected value X in the candidate threshold value group Y.

Note that m is an integer that is greater than or equal to 1 and less than or equal to n. Due thereto, the first threshold value can be adjusted so as to become a first threshold value that corresponds to the state of the finger of the operator. The fact that the operator has carried out an operation can be detected regardless of whether or not the operator is wearing gloves, and regardless of individual differences and the state of the operator's fingertip. For example, in a case in which the operator is wearing gloves, a value that is relatively low is acquired as the detected value X, and therefore, a threshold value that is suited to the detected value X is set as the first threshold value as well. Due thereto, even if an operator operates the electrostatic switch while wearing gloves, the operation can be detected. Further, in a case in which the operator is not wearing gloves, a relatively high value is acquired as the detected value X, and a threshold value that is suited to the detected value X is set as the first threshold value as well.

In a case in which the detected value X is less than or equal to the smallest candidate threshold value Yn in the candidate threshold value group Y, the candidate threshold value Yn is set as the first threshold value Z1. A value, which is greater than the electrostatic capacity that is detected even though a person's finger or the like is not contacting the operation surface, is set as Yn. In a case in which the electrostatic switch 1 is provided at the steering wheel of a vehicle as in the present embodiment, the electrostatic sensor 201 will detect electrostatic capacity due to noise emitted by onboard equipment. By setting the first threshold value to a threshold value that is at least Yn or greater, the concern of erroneously detecting operation due to noise can be reduced.

In a case in which the power supply state of the input accepting device 100 is made to transition from the stopped state to the operating state by the power supply state transitioning section 12, the setting section 14 may set an initial value, regardless of the setting of the first threshold value in the operating state of the previous time. Due thereto, the initial value can be set regardless of the setting of the first threshold value in the operating state of the previous time. For example, even in a case in which, in the operating state of the previous time, a vehicle occupant operated the electrostatic switch 200 without gloves on, and, in the next operating state, a vehicle occupant operates the electrostatic switch 2000 with gloves on, because the first threshold value is set to an initial value, the possibility that operation of the electrostatic switch 2000 can be detected increases. The initial value of the first threshold value is preferably set to the candidate threshold value Yn. Or, the history of first threshold values that have been set by the setting section 14 in the past may be stored, and a candidate threshold value, which has a high frequency of being set as the first threshold value, may be set as the first threshold value.

In the above description, a case in which it is determined by the contact judging section 13 that there is contact by an operator is made to be the timing of the start of the processing in which the setting section 14 sets the first threshold value Z1 (the setting processing) (i.e., this case is made to be the first condition). Due thereto, the threshold value can be updated even if the state of the wearing of gloves changes during the time period from start-up to stopping of the vehicle.

Further, the setting processing may be started in parallel with the operation accepting processing. It suffices for a first threshold value, which is set by one instance of contact, to be used as the first threshold value for the operation accepting processing at the time of the next instance of contact. There is no need to again carry out a contacting operation after setting of the threshold value, and the bother can be reduced.

Other conditions may be combined in addition to the first condition as the timing of the start of the setting processing. Hereinafter, examples of conditions for starting the setting processing by the setting section 14 are described.

First Example of Start Conditions

In a first example of the start conditions, in addition to the above-described first condition, the input accepting device 100 transitioning from the stopped state to the operating state is made to be a start condition for the setting processing. Namely, the setting section starts the setting processing in a case in which the first condition is satisfied, and the input accepting device 100 has transitioned from the stopped state to the operating state. Due thereto, the first threshold value Z1 can be updated only once during the time from the input accepting device starting-up until stopping. As described above, the transitioning of the input accepting device 100 to the stopped state and the operating state is related to the power supply state of the vehicle and the state of riding of vehicle occupants. In other words, in the first example of start conditions, setting processing is started in a case in which the above-described first condition is satisfied, and the power state of the vehicle is the stopped state, and a vehicle occupant has entered into the vehicle from a state in which no vehicle occupant was in the vehicle. Namely, during the time period from the time when a vehicle occupant enters the vehicle to the time when the vehicle occupant exits the vehicle, the first threshold value Z1 can be updated only one time. Due thereto, while the bother that is due to the first threshold value Z1 being updated each time the electrostatic switch is contacted is reduced, the first threshold value Z1 can be updated in cases in which the operator changes to a different person and also in cases in which the state of wearing gloves changes.

Second Example of Start Conditions

Another example of the start conditions for the setting processing by the setting section 14 is described. In a second example of the start conditions, in addition to the above-described first condition, a second time period having elapsed from the previous setting processing is made to be a start condition for the setting processing. Due thereto, the first threshold value Z1 is updated at least each second time period. While the bother that is due to the threshold value being updated each time the electrostatic switch is contacted is reduced, the first threshold value Z1 can be updated in cases in which the operator takes-off his/her gloves while the vehicle is in the midst of traveling, or the like.

The second time period may be changed in accordance with the traveling state of the vehicle. As an example, the second time period is made to be long in a case in which the vehicle turns right or turns left at an intersection. During the time period when a vehicle is turning right or turning left at an intersection, the possibility that a vehicle occupant will put-on or take-off gloves or the like is low, and the need to change the first threshold value Z1 is low. On the other hand, the possibility that a finger may contact the electrostatic switch 2000 because of steering is high. By making the second time period be long in such a case, the processing of setting the first threshold value Z1 being executed unnecessarily can be reduced. Although left/right turns have been given as an example of the traveling state, the second time period can be changed in accordance with various traveling states such as times when the vehicle is stopped, times when the vehicle is traveling on a curve, or the like.

Figure 3:
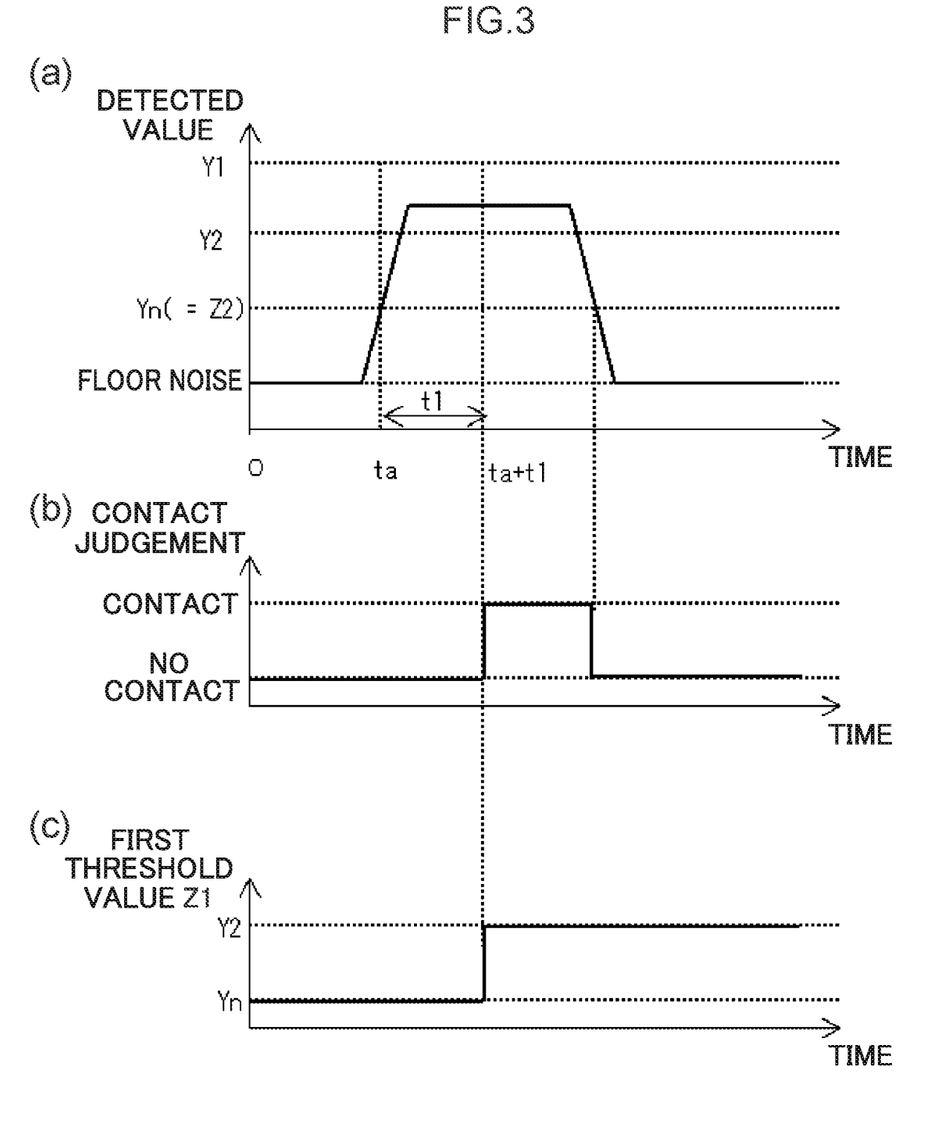
FIG. 3 is graphs showing an example of changes over time in a detected value of an electrostatic sensor relating to the embodiment.
Figure 4:
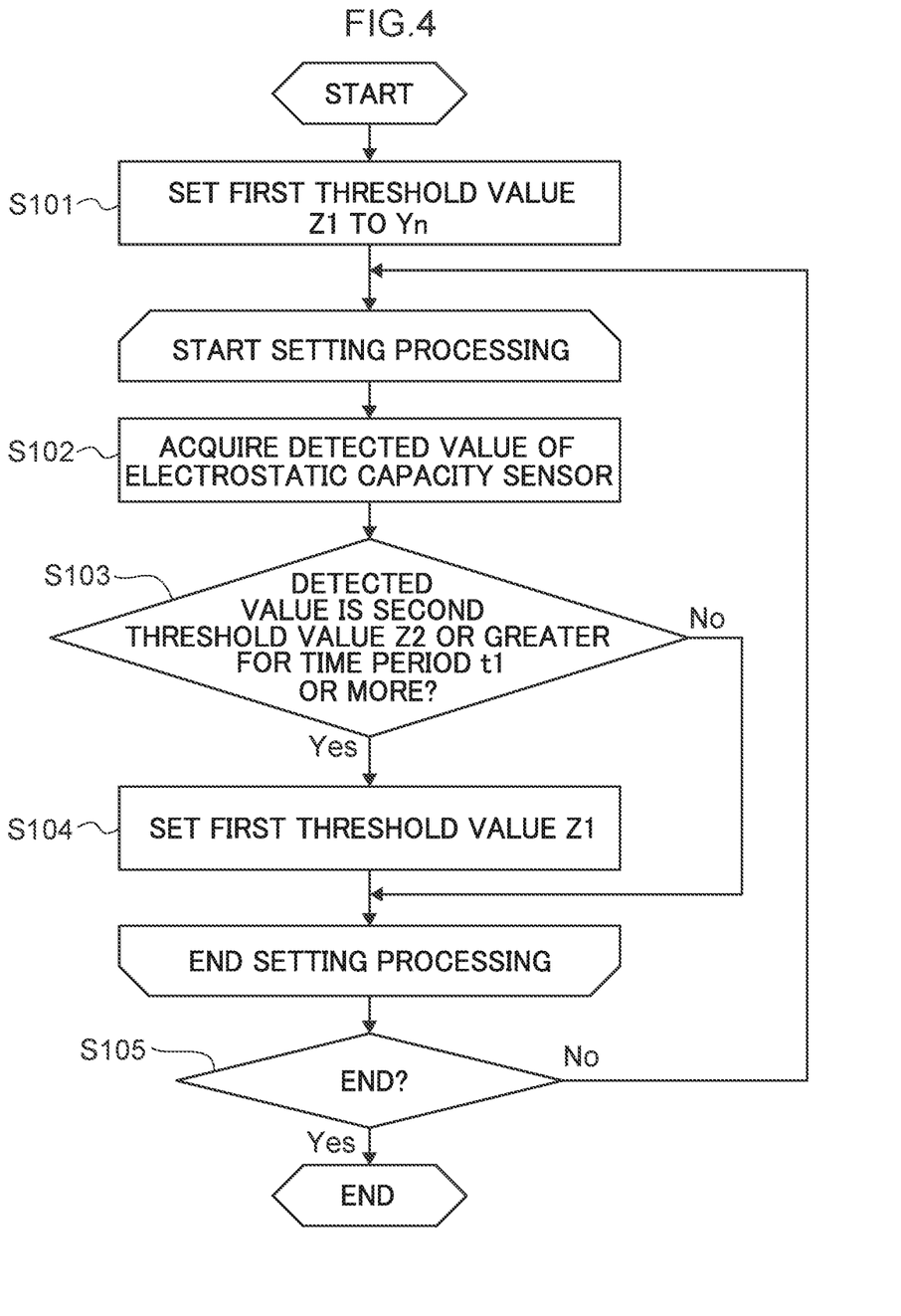
FIG. 4 is a flowchart showing an example of the flow of setting processing by the input accepting device relating to the embodiment.

The processings of the input accepting device 100 relating to the present disclosure include the setting processing and the accepting processing. First, the setting processing will be described by using FIG. 3 and FIG. 4. FIG. 3 is an upper drawing showing changes over time in the detected value detected by the electrostatic sensor 201, a middle drawing showing changes over time in the judgment by the contact judging section 13, and a lower drawing showing a graph that illustrates an example of changes over time in the first threshold value Z1 that is set by the setting section 14. FIG. 4 is a flowchart showing an example of the flow of the setting processing by the input accepting device 100 relating to the embodiment. Adjustment of the first threshold value Z1 is devised due to the accepting processing and the setting processing that are shown in FIG. 4 being executed. This setting processing is control that is repeatedly executed at a predetermined interval due to a predetermined control program being executed at the ECU 1000. As an example, this processing is started due to starting-up of the vehicle.

As shown in FIG. 4, when the series of processings starts, in S101, the setting section 14 sets the first threshold value Z1 to Yn.

Next, the routine moves on to the setting processing. In the setting processing, in S102, the electrostatic capacity acquiring section 11 acquires the detected value of the electrostatic capacity from the electrostatic sensor 201. In S103, based on the acquired detected value, the contact judging section 13 determines whether there is contact by an operator. As an example, it is determined that there is contact in a case in which the contact judging section 13 determines whether the detected value has been the second threshold value Z2 or more for the time period t1 or more, and the judgment is affirmative. In a case in which it is determined in S103 that there is contact, the routine moves on to S104. In S104, the threshold value Z1 is set by the setting section 14. In a case in which it is not determined in S103 that there is contact, the setting processing is ended.

The present control ends due to, for example, stoppage of the operating state of the power of the vehicle (Yes in S105).

An example of changes over time in the detected value detected by the electrostatic sensor 201 that are shown in the upper drawing of FIG. 3, changes over time in the determination by the contact judging section 13 that are shown in the middle drawing of FIG. 3, and changes ss over time in the threshold value Z1 set by the setting section 14 that are shown in the lower drawing of FIG. 3, which changes result from application of the flowchart of FIG. 4, is described by using FIG. 3. In FIG. 3, the time when the vehicle starts-up is made to be 0.

As shown in the lower drawing of FIG. 3, at time t0, the first threshold value Z1 is Yn. Next, at time ta, as shown in FIG. 3, the electrostatic capacity detected by the electrostatic sensor 201 increases and becomes Yn or greater. Because the first threshold value Z1 is Yn, the operation accepting section accepts the input operation to the electrostatic sensor 201, and outputs a control signal to the control object device 300 in correspondence with the operation.

Further, in the present embodiment, the second threshold value Z2, which is used in the contact judging section 13 judging whether there is contact, is set to be Yn. Due to the time period t1 elapsing from the point in time when the detected value became greater than or equal to Yn (the second threshold value Z2), the contact judging section 13 determines that there is contact, as shown in the middle drawing of FIG. 3. Due thereto, the setting section 14 sets the first threshold value Z1 based on the detected value. In the present embodiment, the detected value is smaller than the candidate threshold value Y1, and is greater than the candidate threshold value Y2. Therefore, the first threshold value Z1 is set to Y2. Due thereto, the first threshold value Z1, which is for accepting operation input to the electrostatic switch 2000, can be adjusted to an appropriate value.

Figure 5:
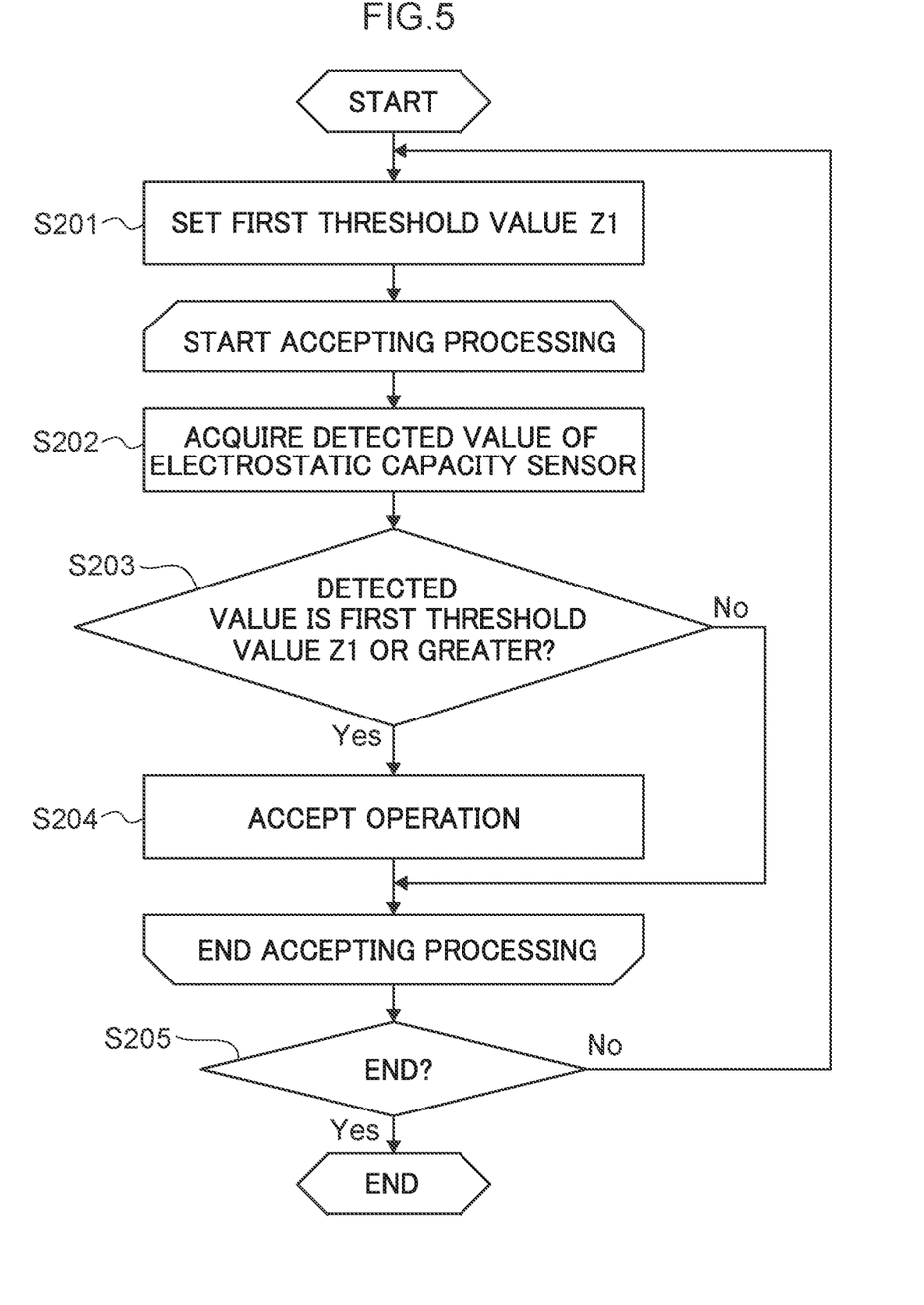
FIG. 5 is a flowchart showing an example of the flow of accepting processing by the input accepting device relating to the embodiment.

The accepting processing is described by using FIG. 5. FIG. 5 is a flowchart showing an example of the flow of the accepting processing by the input accepting device 1000 relating to the embodiment. Acceptance of input operation by an operator is devised due to the accepting processing shown in FIG. 5 being executed. This accepting processing is control that is repeatedly executed at a predetermined interval due to a predetermined control program being executed at the ECU 1000. As an example, this processing is started due to starting-up of the vehicle.

As shown in FIG. 5, when the series of processings starts, in S201, the setting section 14 sets the first threshold value Z1. The setting section 14 sets the first threshold value Z1 to Yn before the above-described setting processing is carried out. In a case in which the setting processing is carried out, the setting section 14 sets the first threshold value Z1 based on the detected value detected by the electrostatic sensor 201.

Next, the routine moves on to the accepting processing. In S202, the electrostatic capacity acquiring section 11 acquires the detected value of the electrostatic capacity from the electrostatic sensor 201. The acquired detected value is outputted to the contact judging section 13 and the operation accepting section 15. In the accepting processing, in S203, the operation accepting section 15 determines whether the detected value is greater than or equal to the first threshold value Z1. If the detected value is greater than or equal to the first threshold value Z1 (Yes in S203), in S204, the operation accepting section 15 accepts the operation, and outputs a signal to the control object device 300 in correspondence with the inputted operation. If the detected value is not greater than or equal to Z1, the accepting processing is ended without accepting the operation.

Note that the setting processing and the accepting processing have been described separately, but the accepting processing may be carried out before the setting processing or simultaneously with the setting processing. Further, although the acquiring step by the electrostatic capacity acquiring section is described with S102 and S202 being different, the same detected value of the electrostatic capacity may be used.

Further, the processings that are carried out at the ECU 1000 in the embodiment are described as software processings that are carried out by a program being executed. However, the present disclosure is not limited to this, and, for example, these processings may be processings that are carried out by hardware. Or, they may be processings that combine both software and hardware. In the case of software processings, the program may be stored and distributed on any of various types of non-transitory storage media such as a DVD (Digital Versatile Disc) or the like, and the program may cause a processor such as the CPU 1002 of the ECU 1000 or the like to execute the processings.

Note that the above-described embodiment is merely an example, and is not intended to exclude application of various modifications and techniques that are not expressly described in the embodiment. The various structures of the present embodiment can be implemented by being modified in various ways within a scope that does not depart from the gist thereof, and can be selected as needed or can be combined appropriately.

What is claimed is:

1. An input accepting device comprising:
a memory; and
a processor coupled to the memory,
the processor being configured to:
   detect a value of electrostatic capacity due to contact by an operator by an electrostatic sensor and compare the detected value to a first threshold value that is predetermined;
   accept an operation when the detected value is greater than or equal to the first threshold value;
   after accepting the operation, compare the detected value to a second threshold that is predetermined, the second threshold being greater than the first threshold;
   when the detected value is greater than or equal to the second threshold for a first time period, determine that there is contact by the operator; and
   after the detected value is greater than or equal to the second threshold for the first time period and it is determined that there is contact by the operator, update the first threshold value to a value that is greater than or equal to the second threshold value.

2. The input accepting device of claim 1, wherein the processor is further configured to, when it is determined that there is contact by the operator, update the first threshold value based on an average value of detected values detected by the electrostatic sensor during the first time period.

3. The input accepting device of claim 1, wherein the processor is further configured to:
   predetermine one candidate threshold value of two or more candidate threshold values as the first threshold value; and
   update a candidate threshold value, which is smaller than the detected value detected by the electrostatic sensor and is close to the detected value of the two or more candidate threshold values, as the first threshold value.

4. The input accepting device of claim 3, wherein the processor is further configured to:
   when the detected value is greater than a candidate threshold value that is smallest of the two or more candidate threshold values, update a candidate threshold value, which is smaller than the detected value and is close to the detected value of the two or more candidate threshold values, as the first threshold value; and
   when the detected value is less than or equal to the smallest candidate threshold value of the two or more candidate threshold values, update the smallest candidate threshold value as the first threshold value.

5. The input accepting device of claim 1, wherein the input accepting device is an onboard device that transitions from a stopped state to an operating state when a vehicle transitions from a state other than a first state to the first state, and the processor is further configured to, when the input accepting device transitions from the stopped state to the operating state, set the first threshold value to an initial value regardless of updating of the first threshold value in an operating state of a previous time.

6. The input accepting device of claim 1, wherein the processor is further configured to, during a time period in which a second time period has not elapsed from setting of the first threshold value, not update the first threshold value even if it is determined that there is contact by the operator, and, when, after the second time period has elapsed, it is determined that there is contact by the operator, update the first threshold value again.

7. The input accepting device of claim 6, wherein:
   the electrostatic sensor is provided at a steering wheel of a vehicle, and
   the second time period is changed based on a traveling state of the vehicle.

8. An input accepting method performed by a processor, the input accepting method comprising:
   detecting a value of electrostatic capacity due to contact by an operator by an electrostatic sensor and comparing the detected value to a first threshold value that is predetermined;
   accepting an operation when the detected value is greater than or equal to the first threshold value;
   after accepting the operation, comparing the detected value to a second threshold that is predetermined, the second threshold being greater than the first threshold;
   when the detected value is greater than or equal to the second threshold for a first time period, determining that there is contact by the operator; and
   after the detected value is greater than or equal to the second threshold for the first time period and it is determined that there is contact by the operator, updating the first threshold value to a value that is greater than or equal to the second threshold value.

9. The input accepting method of claim 8, further comprising:
   when it is determined that there is contact by the operator, updating the first threshold value based on an average value of detected values detected by the electrostatic sensor during the first time period.

10. The input accepting method of claim 8, further comprising:
    predetermining one candidate threshold value of two or more candidate threshold values as the first threshold value; and
    updating a candidate threshold value, which is smaller than the detected value detected by the electrostatic sensor and is close to the detected value of the two or more candidate threshold values, as the first threshold value.

11. The input accepting method of claim 10, further comprising:
    when the detected value is greater than a candidate threshold value that is smallest of the two or more candidate threshold values, updating a candidate threshold value, which is smaller than the detected value and is close to the detected value of the two or more candidate threshold values, as the first threshold value, and
    when the detected value is less than or equal to the smallest candidate threshold value of the two or more candidate threshold values, updating the smallest candidate threshold value as the first threshold value.

12. The input accepting method of claim 8, wherein the method is used in an onboard device that transitions from a stopped state to an operating state when a vehicle transitions from a state other than a first state to the first state,
    wherein the method further comprises, when the onboard device transitions from the stopped state to the operating state, updating the first threshold value to an initial value regardless of setting of the first threshold value in an operating state of a previous time.

13. A non-transitory computer-readable storage medium storing instructions that, when executed by a processor of an input accepting device, cause the input accepting device to:
  detect a value of electrostatic capacity due to contact by an operator by an electrostatic sensor and compare the detected value to a first threshold value that is predetermined;
  accept an operation when the detected value is greater than or equal to the first threshold value;
  after accepting the operation, compare the detected value to a second threshold that is predetermined, the second threshold being greater than the first threshold;
  when the detected value is greater than or equal to the second threshold for a first time period, determine that there is contact by the operator; and
  after the detected value is greater than or equal to the second threshold for the first time period and it is determined that there is contact by the operator, update the first threshold value to a value that is greater than or equal to the second threshold value.

14. The non-transitory storage medium of claim 13, wherein the instructions further cause the input accepting device to, when it is determined that there is contact by the operator, update the first threshold value based on an average value of detected values detected by the electrostatic sensor during the first time period.

15. The non-transitory storage medium of claim 13, wherein the instructions further cause the input accepting device to:
  predetermine one candidate threshold value of two or more candidate threshold values as the first threshold value; and
  update a candidate threshold value, which is smaller than the detected value detected by the electrostatic sensor and is close to the detected value of the two or more candidate threshold values, as the first threshold value.

16. The non-transitory storage medium of claim 15, wherein the instructions further cause the input accepting device to:
  when the detected value is greater than a candidate threshold value that is smallest of the two or more candidate threshold values, update a candidate threshold value, which is smaller than the detected value and is close to the detected value of the two or more candidate threshold values, as the first threshold value; and
  when the detected value is less than or equal to the smallest candidate threshold value of the two or more candidate threshold values, update the smallest candidate threshold value as the first threshold value.

17. The non-transitory storage medium of claim 13, wherein the input accepting device is used in an onboard device that transitions from a stopped state to an operating state when a vehicle transitions from a state other than a first state to the first state, wherein the instructions further cause the input accepting device to, when the onboard device transitions from the stopped state to the operating state, update the first threshold value to an initial value regardless of setting of the first threshold value in an operating state of a previous time.

* * * * *